3,392,624
FLASHING-LIGHT SPECTROPHOTOMETER WITH MONOCHROMATIC MONITORING
Bacon Ke, Yellow Springs, Richard W. Treharne, Xenia, and Charlton K. McKibben, Dayton, Ohio, assignors to Charles F. Kettering Foundation, Yellow Springs, Ohio, a corporation of Ohio
Filed Nov. 9, 1964, Ser. No. 409,659
5 Claims. (Cl. 88—14)

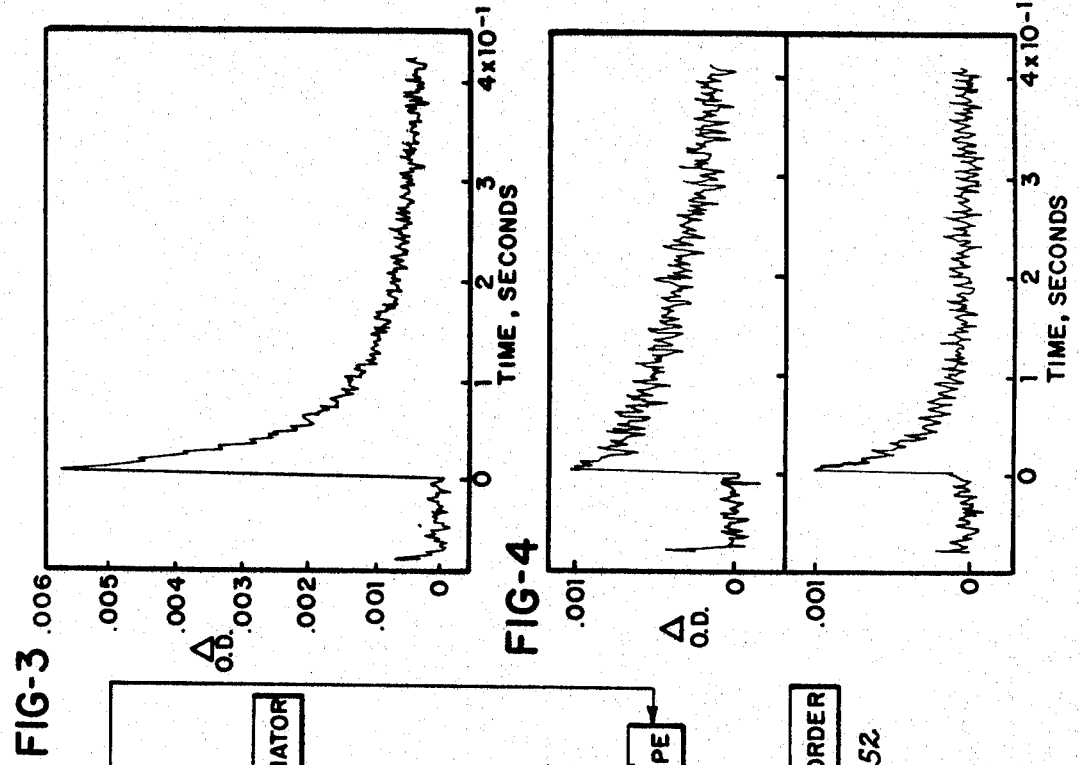
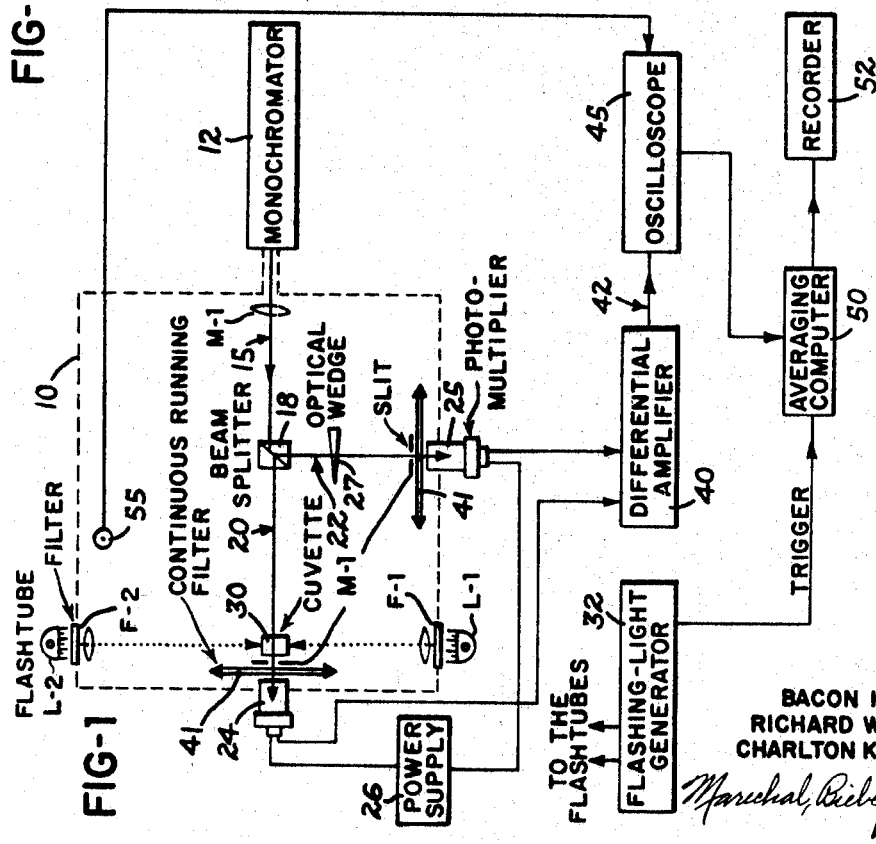

ABSTRACT OF THE DISCLOSURE

A spectrophotometer for measuring fast absorption changes occurring during photosynthesis uses repetitive, intense light flashes with 20-$\mu$ sec. duration to initiate the reaction. The pulse generator is capable of producing two flashes, simultaneously or with variable time separation. A monochromatic monitoring light is split into a sample beam and a reference balancing beam. Photomultiplier outputs are fed to a differential circuit so that net absorption changes could be measured. A wideband oscilloscope and a computer of average transients are used to extract small signals from a high noise background. Transient optical density changes as small as 0.0001 could readily be measured. The performance of the apparatus, especially in conjunction with the CAT computer, is illustrated with the absorption change at 515 m$\mu$ in Chlorella and spinach chloroplasts.

---

This invention relates to spectrophotometers and particularly to improvements in flashing-light spectrophotometers used for studying high speed reactions such as occur during photosynthesis.

There is a technique of photolysis which originally was applied to the study of gas-phase reactions, and which has been extended to the study of solution reactions. The present invention is concerned particularly with apparatus used to study the reaction kinetics which occur with regard to change in absorption of a particular sample of material during a short time, and with respect to a particular wave length as obtained from a constant monitoring beam of light. The apparatus provides a means for studying the photochemical reactions which occur for example in photosynthesis, by following or observing, and recording, an absorption change of the material being studied at a single wave length and during a relatively short period of time, measured for example in a fraction of a second.

Basically, the apparatus records this change in absorption by exposing the sample to a monitoring beam of light which is a monochromatic beam and of predetermined intensity, and while exposing the sample to this monochromatic light subjecting the sample to photoexcitation from a high intensity flash of light of extremely short duration, such as obtained from a xenon flash tube. The flash light is filtered from the observing transducer, and thus the change in electrical output of the transducer during the flash photoexcitation is directly related to the transient absorption change which occurs during or immediately after such excitation.

Therefore, the principal object of this invention is to provide an improved spectrophotometer apparatus which is capable of accurately observing and recording short term absorption changes in samples of material which are subjected to photoexcitation.

Another object of the invention is to provide an improved flash spectrophotometer in which the amount and duration of photoexcitation to which the sample under study is subjected can be carefully regulated, and can be reproduced at frequent accurately spaced intervals.

Another object of the invention is to provide such spectrophotometer apparatus wherein a sample is subjected to a substantially large number of repeated photoexcitations, and wherein the resulting output signals from the spectrophotometer are applied to an averaging computer, which functions to extract the signal related to absorption changes from high amplitude noise signals which may be introduced during the test.

An additional object of the invention is to provide an improved flash spectrophotometer which is capable of producing output signals which are directly related only to the change in absorption of a reference beam of monochromatic light during and following excitation from a flash source of light.

Other objects and advantages of the invention will be apparent from the following description, the accompanying drawings and the appended claims.

In the drawings—

FIG. 1 is a block diagram of a flashing light spectrophotometer according to the present invention;

FIGS. 3 and 4 are plots of typical transient absorption changes recorded through use of the apparatus.

Figure 2:
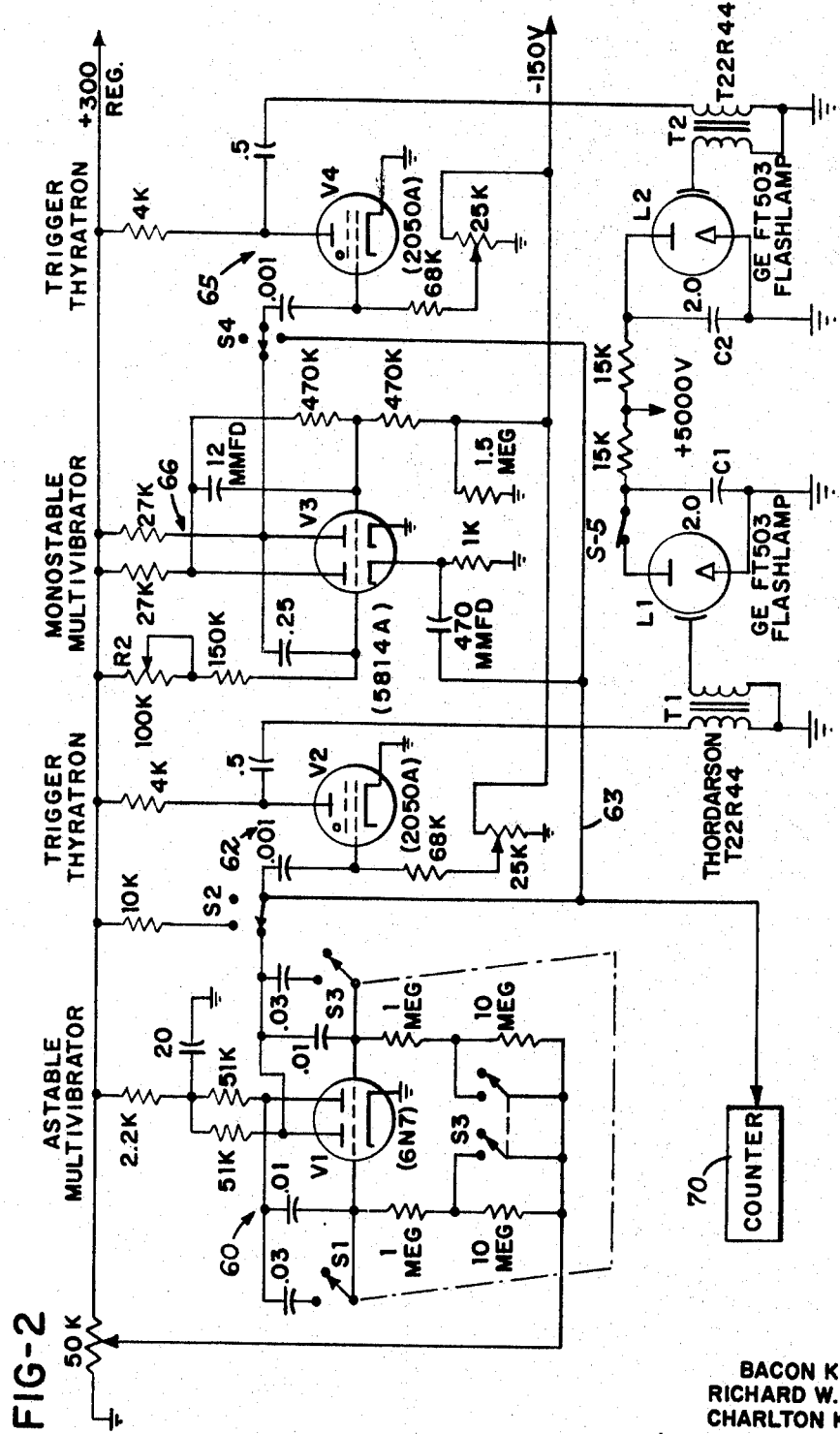
FIG. 2 is a block and circuit diagram of a suitable flashing light generator used in the apparatus shown in FIG. 1.

Refering to the drawings, which illustrate a preferred embodiment of the invention, the optical components and transducers of the spectrophotometer are incorporated in a light-tight housing 10 indicated in dotted lines. Into this housing there is introduced a beam of monochromatic light which may be obtained from a suitable monochromator 12. The source beam is indicated at 15. In a suitable form of apparatus constructed according to the invention a six volt D.C. tungsten-ribbon light source was used in combination with a Bausch & Lomb 500 mm. grating monochromator. The light source was powered by a highly regulated power supply or suitable storage batteries which were kept fully charged by a magnetic amplifier regulated D.C. power supply to maintain the monitoring light at constant intensity. Other suitable provisions can be made for the same purpose. During experiments hereinafter described an exit slit width of 1.5 mm. was used, and at this width the band width of the source beam was five millimicrons (m$\mu$).

This source beam is directed onto a beam splitting means, for example a prism beam splitter 18 which divides the source beam into two separate beams of light having a predetermined intensity ratio. With the prism beam splitter used, a monitoring beam 20 and a reference beam 22 were obtained in the approximate intensity ratio of 2:1, and these beams are directed along separate and divergent paths as shown.

The monitoring beam 20 is directed into a photoelectrical transducer, in the form of photomultiplier 24, and the reference beam 22 is directed into a second transducer, the photomultiplier 25. A suitable power supply 26 is connected to the photomultipliers. The reference beam is intercepted by a neutral-density optical wedge 27 (which can be obtained for example from Eastman Kodak Company). This wedge is mounted to be moved across the beam by any suitable means (not shown) whereby adjustment of the position of the optical wedge will result in a variation in its transmission from 100 to 0%.

The sample of material to be studied is held by any suitable means to intercept the monitoring beam 20. For example, a suitable cuvette 30 containing the material can be mounted in front of the photomultiplier 24. Some of the beam 20 will be absorbed by the sample at all times, and it is for this purpose that the adjustable optical wedge 27 is provided, in order to balance out this constant absorption of the monitoring beam, as will be more fully described.

The sample in the cuvette is excited by high intensity, short duration light flashes which are provided by flash lamps or tubes L–1 and L–2 (G.E. FT503). The flash tubes are powered by a flashing light generator 32, details of which are shown in FIG. 2 and will be later described in detail, and the outputs of the photomultipliers 24 and 25 are supplied to a differential amplifier 40.

Since it is desired that the photomultipliers respond only to light from the monitoring beam it is necessary to shield the exciting light flashes from the photomultipliers. For this purpose, a continuous running interference filter 41 is placed in front of each of the photomultipliers 24 and 25. A suitable filter for this purpose is the Veril B 200, Schott, obtainable from Fish-Schurman of New Rochelle, N.Y. This filter has a wave length range from 400–800 millimicrons, a transmission of approximately 40% and a 25 millimicron pass band when used with a 2 mm. slit. These are wedge interference filters, and preferably are mounted in a slide in front of each of the photomultipliers so that they can be moved to select any desired wave length.

To reduce further leakage of excitation light flashes into the photomultipliers, additional sharp cut off filters (available from Corning) are used. Filters M–1 may be used for the monochromatic source beam. For the 515 millimicron monitoring source beam, a Corning filter No. 9782 has been used.

Also, homogeneous interference filters F–1 and F–2 are mounted in front of each of the lamps L–1 and L–2, to control the light emitted by these lamps into the housing 10. Suitable filters for this purpose are available from Spectrolab of North Hollywood, Calif., or Baird-Atomic of Cambridge, Mass. These filters can be used to provide either monochromatic light flashes or flashes with broader wave length limits for excitation purposes. The narrowband filters have a half-width of approximately ten millimicrons and a sharp cut off. For use in the experiments described hereafter Baird-Atomic interference filters are used with wave length range between 640 and 740 millimicrons.

As part of the filter system to reduce leakage of excitation flashes into the photomultipliers, suitable sharp cut off filters are also incorporated in the filter systems F–1 and F–2. For example, Corning filters No. 2403 have been used with the 640–740 millimicron excitation lights previously mentioned.

With the sample in place in the cuvette 30, the output from the two photomultipliers is balanced by adjustment of the optical wedge 27, such that the output from the differential amplifier 40 is zero before photoexcitation. The differential amplifier thus works as a comparator circuit with its output signal varying in amplitude (and polarity where absorption might decrease) according to changes in absorption of the sample. The output line 42 of the differential amplifier is connected to an oscilloscope 45 (e.g., a dual beam such as Type 555, Tektronix) which will display the output signal as a trace representing the momentary change in absorption of the sample in response to each photoexcitation.

The signal-to-noise ratio at the output of the differential amplifier is maintained optimum by various precautions known in the electronic art. For example, a low dynode voltage is used, and the amplifier tubes and the circuit parameters are carefully selected, and appropriate shielding is used to maximize the signal-to-noise ratio. Even with this optimum arrangement, the signal-to-noise ratio may be marginal, and further improvements in it would require the use of a higher intensity of monitoring light beam, since the signal-to-noise ratio is proportional to the square root of the intensity. However, increased intensity of the monitoring beam may not be desirable, because, in the wave length region where the sample material absorbs strongly, the more intense monitoring light itself may sensitize additional reactions.

For true reproduction of the time course of absorption changes, a wide bandwidth system is needed. For example, the bandwidth of a device constructed according to the invention was calculated to be 10 kc.

To prevent either using a high intensity monitoring light, or introducing wave form distortion by electrical filtering, an averaging computer (such as "Computer of Average Transients" available from Mnemotron Corporation, White Plains, N.Y.) is provided to extract the signal from a high amplitude background noise. This computer is indicated generally at 50 in FIG. 1, and its output is fed to an XY recorder 52 (e.g. Model 135, Moseley, of Pasadena, Calif.). The output of the computer is also displayed on a cathode ray tube, which is now shown in the drawings.

The computer, which is commercially available, and details of which are known as described in U.S. Patent No. 3,087,487, is especially suited for measuring a repetitive signal such as is generated in experiments conducted with this apparatus. The computer samples the material at 400 intervals, and the amplitude of the signal at each interval is converted into a digital count and stored in a memory. The stimulus pulses synchronize the averaging process with the result that the desired response is reinforced, in other words signal additions are all in phase. Random noise that is unrelated to the signal will sum out of phase and will thus tend to average to zero. The improvement in the signal is proportional to the square root of the number of signal accumulations.

The oscilloscope 45 is used for monitoring the output signal, or as a read out device for signals with low noise. If desired, the output signal from the differential amplifier 40 may be displayed as one trace, and the second channel of the oscilloscope may be used for various simultaneous recordings. For example, by installing a phototube 55 inside the enclosure 10 and exposed to light from the exciting flash lamps L–1 and L–2, its output may be coupled into the second channel of the oscilloscope and used to display the sequence, intensity, and profile of the light flashes.

FIG. 2 shows a suitable construction for the flashing light generator 32, capable of producing two light flashes either simultaneously, or with predetermined time separation. Since details of the circuitry are shown, only the general arrangement will be described, as the construction of the circuit will be obvious to those skilled in the art from the drawings. The generator includes an astable multivibrator 60, including the dual triode V–1. The output frequency of this multivibrator can be varied between one and one hundred twenty pulses per second by appropriate adjustment of potentiometer R–1 and the ganged range switches S–1 and S–3. The output of the multivibrator 60 is available at one contact of the selector switch S–2, the switch being shown closed on that contact. The common contact of switch S–2 leads to the input to a trigger circuit 62 including a thyratron V–2, and also through line 63, to one contact of a selector switch S–4. The common contact of switch S–4 leads to the input of a trigger circuit 65 including thyratron tube V–4. Line 63 is also coupled into one cathode circuit of tube V–3 which is part of a monostable multivibrator circuit 66, and the output of circuit 66 is connected to another input contact of selector switch S–4.

The output of the trigger thyratron 62 is connected to the primary of pulse transformer T–1, which drives the flash lamp L–1; similarly, the output of trigger thyratron circuit 65 is coupled to the pulse transformer T–2 which controls the flashing lamp L–2. By appropriate operation of switches S–2 and S–4 and S–5, it is possible to obtain a single flash of either lamp, or repeated flashes of one or both, either simultaneously, or with predetermined time separation between the two flashes.

For example, with S–2, S–4 and S–5 in the position shown, a pulse from the multivibrator circuit 60 will cause the trigger thyratron circuit 62 to fire L-1 immediately, and will pulse the monostable vibrator 66, which, after a predetermined delay (variable by appropriate adjustment of potentiometer R-2) will transmit an output pulse through S-4, in the position shown, to the trigger circuit 65, causing L-2 to fire. By moving S-4 to the contact connected to the line 63, both trigger circuits can be pulsed simultaneously from the multivibrator 60, and the lamps will flash simultaneously. If desired, S-4 can also be moved to its open contact, whereupon only L-1 will be operative and the trigger circuit 65 and flash lamp L-2 will be disconnected from the generator.

Also, if a single flash is desired from one or both of the flash lamps, switch S-2 can be coupled directly to the B+ supply through the 10K resistor, and this will provide a single pulse to one or both of the trigger circuits, depending upon the position of S-4.

In order to keep track of the total analysis time, which is required when the averaging computer is used, the initiating pulses are made available from line 63 to a suitable binary counter 70, which keeps track of the total number of light flashes employed during any given test.

With this flashing light generator, it was possible to obtain the desired short light flashes, however, the light energy falls off rapidly with shorter flash times. Therefore, a compromise has to be obtained between the duration and the intensity of the light flashes. With the circuit shown, operating at a maximal anode voltage of 5,000 v. with a two microfarad discharge capacitor, the energy delivered to the lamp was twenty-five joules, and the duration was measured to be twenty microseconds at half-peak height. The cut-off was observed to be sharp, the duration at peak height being less than fifty microseconds. As is known, the flash intensity and duration can be increased or decreased as desired by appropriate increase or decrease in the capacity of C1 and C2 in the flash lamp circuits.

In order to maintain a complete record of the test results it was necessary to monitor the intensity of the monitoring beam and the excitation light. Apparatus for this purpose does not form a part of the present invention, but is described for purposes of background information. The intensity of the monitoring light and the excitation light has been measured with a thermal and a photoelectric detector, respectively. A bismuth-silver, twelve-junction thermopile was used in conjunction with a D.C. breaker amplifier for measuring the monitoring beam intensity. The thermopile was calibrated with a standard light source. Intensity of the 515 millimicron monitoring beam was measured at 186 ergs·cm.$^{-2}$·sec.$^{-1}$ under typical operating conditions.

The flash intensity was measured with a photoelectric detector known as a Lite-Mike, in conjunction with the oscilloscope. The Lite-Mike contains a precalibrated silicon diode and has a spectral response in the visible and near infrared range. The twenty microsecond flash with wave length limit between 620 and 720 millimicrons was observed to have an instantaneous peak intensity of $2.5 \times 10^7$ ergs·cm.$^{-2}$·sec.$^{-1}$.

FIG. 3 is a reproduction of a transcription of the display of the computer of average transients on the XY recorder, showing the transient absorption increase at 515 millimicrons induced by short red light flashes in the unicellular alga Chlorella. The flash-induced change in optical density change was of the order of 10$^{-3}$. The half-life of decay was estimated to be about forty milliseconds. The limit of time resolution using the averaging computer is about fifty microseconds.

By comparing the display on the oscilloscope with the display on the cathode ray tube computer screen it was observed that the signal-to-noise ratio was improved from approximately 2:1 to 16:1, based on an average of twenty-five accumulations displayed on the computer screen.

FIG. 4 shows a similar reproduction from the XY recording made for flash-induced absorption changes at 515 millimicrons in broken Chloroplasts. During this test, the amplitude of the signal was almost indiscernible on the oscilloscope screen operated at a sensitivity comparable to that used for Chlorella studies. Twice as many accumulations of repetitive signals were required to produce the display shown in FIG. 4. The decay in broken Chloroplasts was much slower than in whole-cell Chlorella, with a half-life estimated to be one hundred fifty milliseconds.

The present invention thus provides a novel spectrometer which is capable of measuring accurately extremely rapid changes in absorption such as occur during photosynthesis. The spectrometer apparatus is particularly advantageous in the light balancing arrangement, involving the use of a monochromatic monitoring source, beam splitter, to photomultipliers driving a differential amplifier, and the adjustable optical wedge for balancing the photomultiplier output. This balancing compensates transmission as well as scattering in the monitoring light, and has the additional advantage that changes due to fluctuation in power supply or the light source will cancel out, since the output of the differential amplifier is representative of the difference in intensity in the two photomultipliers.

Another feature of the present invention concerns the provision of two flash exciting lamps, L-1 and L-2, together with their corresponding changeable filters, F-1 and F-2. As described, it is possible to energize these exciting lamps simultaneously, and by providing different filters for each exciting flash lamp, it is possible to study the response of a sample to excitation by simultaneous bursts or flashes of light of different wave lengths. Excitation by light at one wave length, and at a second wave length, will not necessarily be summed when the same material is excited simultaneously by light of both wave lengths. Rather, a unique response is obtained in many cases under such a "dual wave length" excitation. The present invention provides for easy adaptation to such studies.

While the form of the apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A spectrophotometer for study of absorption changes,
    comprising means providing a source beam of monochromatic light which is constant during flash excitation of the sample under test and means for splitting said source beam into a monitoring beam and a reference beam having predetermined intensity ratio,
    detecting means including a first photoelectric transducer mounted to receive said monitoring beam and a second photoelectric transducer mounted to receive said reference beam,
    a comparator circuit connected to said detecting means to provide an output related to the difference in response of said transducers,
    means for supporting a sample of material to be tested in front of said first transducer,
    an adjustable optical filter mounted to intercept said reference beam for adjusting the intensity thereof as received by said second transducer to null the output of said comparator circuit for the sample under test.
    a source of exciting flash light of different wavelength than said source beam and arranged to illuminate the sample at the same time the sample is exposed to said monitoring beam to cause momentary photoexcitation of a sample,
    filter means arranged to shield said transducers from said flash light whereby said transducers respond only to light received from said beams, and recording means operated by said comparator means to display the output thereof particularly in response to momentary changes in absorption of said monitoring beam by a sample during exposure of the chamber to an exciting flash of light.

2. A spectrophotometer for study of fast absorption changes, comprising means providing a normally continuous source beam of monochromatic light having a relatively small bandwidth in the order of five millimicrons, a beam splitting prism mounted to intersect said source beam and divide it into a monitoring beam and a reference beam having predetermined intensity ratio and extending along separate spaced paths, detecting means including a first photomultiplier mounted on the path of said monitoring beam and a second photomultiplier mounted on the path of said reference beam, a neutral-density optical wedge mounted for adjustable movement transversely of said reference beam for changing the intensity of the reference beam received by said second photomultiplier, a cuvette mounted to support a sample of material to be studied between said beam splitting prism and said first photomultiplier, a source of exciting flash light of high intensity and short duration including a pair of flash lamps and control circuitry for flashing said lamps in predetermined relationship to illuminate the sample in said cuvette repeatedly for short durations within the period that the sample is exposed to said monitoring beam to cause photoexcitation of the sample, interference filters arranged to shield said photomultipliers from flash light such that said photomultipliers respond only to light received from the respective said beams, a differential amplifier connected to be driven by said photomultipliers and to provide an output related to the differential in response of said photomultipliers, and an oscilloscope connected to be driven by said differential amplifier and operating to display the output thereof.

3. A spectrophotometer as defined in claim 1, including additional filter means mounted adjacent said exciting flash light source and providing for passage only of monochromatic flash light to the sample from said flash light source.

4. A spectrophotometer as defined in claim 1, wherein said source of exciting flash light includes two separate flash lamps each arranged to illuminate the sample independently of the other, and a flashing light circuit connected to each of said lamps and operative selectively to energize said lamps simultaneously or in sequence.

5. A spectrophotometer as defined in claim 4 including additional changeable filter means mounted adjacent each of said exciting flash lamps respectively and providing for passage only of monochromatic flash light of pre-selected and different wavelength from each of each lamps to the sample.

References Cited

UNITED STATES PATENTS 3,062,088  11/1962  Bolz _____ 88—14

OTHER REFERENCES

Davidson et al., Direct Recombination of the Rate of Recombination of Iodine Atoms, vol. 19, No. 10, October 1951, Jour. of Chem. Phys., p. 1311 relied on.

Dramer et al., vol. 51, p. 775, Journal of Opt. Soc. of Am., July 1961.

JEWELL H. PEDERSEN, *Primary Examiner.*

B. LACOMIS, *Assistant Examiner.*